US009364910B2

(12) United States Patent
Okamoto et al.

(10) Patent No.: US 9,364,910 B2
(45) Date of Patent: Jun. 14, 2016

(54) WIRE ELECTRICAL DISCHARGE MACHINING SYSTEM, WIRE ELECTRICAL DISCHARGE MACHINING METHOD, AND WORKPIECE

(71) Applicants: CANON MARKETING JAPAN KABUSHIKI KAISHA, Minato-ku, Tokyo (JP); KABUSHIKI KAISHA MAKINO HURAISU SEISAKUSHO, Kanagawa (JP)

(72) Inventors: Yasuhiro Okamoto, Kurashiki (JP); Akira Okada, Okayama (JP); Haruya Kurihara, Sagamihara (JP)

(73) Assignees: Canon Marketing Japan Kabushiki Kaisha, Tokyo (JP); Kabushiki Kaisha Makino Huraisu Seisakusho, Kanagawa (JP)

( * ) Notice: Subject to any disclaimer, the term of this patent is extended or adjusted under 35 U.S.C. 154(b) by 341 days.

(21) Appl. No.: 13/867,405

(22) Filed: Apr. 22, 2013

(65) Prior Publication Data
US 2013/0284983 A1  Oct. 31, 2013

(30) Foreign Application Priority Data
Apr. 26, 2012  (JP) .................................. 2012-101901

(51) Int. Cl.
*B23H 1/04* (2006.01)
*B23H 7/10* (2006.01)
*B23H 1/02* (2006.01)

(52) U.S. Cl.
CPC .................. *B23H 1/04* (2013.01); *B23H 7/107* (2013.01); *B23H 1/028* (2013.01)

(58) Field of Classification Search
CPC .......... B23H 1/04; B23H 7/107; B23H 1/028; B23H 1/02
See application file for complete search history.

(56) References Cited

U.S. PATENT DOCUMENTS

| 4,193,852 A | * | 3/1980 | Inoue ............................ 205/651 |
| 4,243,864 A | * | 1/1981 | Vieau et al. ................. 219/69.12 |
| 4,438,312 A | * | 3/1984 | Inoue ......................... 219/69.12 |

FOREIGN PATENT DOCUMENTS

| JP | 2009-248719 | 9/1997 |
| JP | 2000-094221 A | * 4/2000 |

(Continued)

OTHER PUBLICATIONS

Machine translation of Japan Patent document No. 2000-094,221, Jun. 2015.*

(Continued)

*Primary Examiner* — Geoffrey S Evans
(74) *Attorney, Agent, or Firm* — Canon USA, Inc., IP Division

(57) ABSTRACT

A mechanism capable of decreasing wires which are not appropriately supplied with power and performing the electrical discharge machining high in uniformity between multiple wires. A wire electrical discharge machining system configured to slice a workpiece at an interval of wires arranged side by side at equally spaced intervals causes the wire to travel in the same direction and includes a power feed contact configured to collectively supply a machining power supply to a plurality of the traveling wires, in which two adjacent power feed contacts respectively come into contact with the plurality of the wires supplied with the machining power supply and arranged without being aligned in the direction vertical to the direction in which the wire travels.

8 Claims, 13 Drawing Sheets

(56) References Cited

FOREIGN PATENT DOCUMENTS

| | | | | |
|---|---|---|---|---|
| JP | 2009-184071 | A | * | 8/2009 |
| JP | 2011-062764 | A | * | 3/2011 |
| JP | 2011062764 | A | | 3/2011 |

OTHER PUBLICATIONS

Machine translation of Japan Patent document No. 2011-062,764, Jun. 2015.*

* cited by examiner

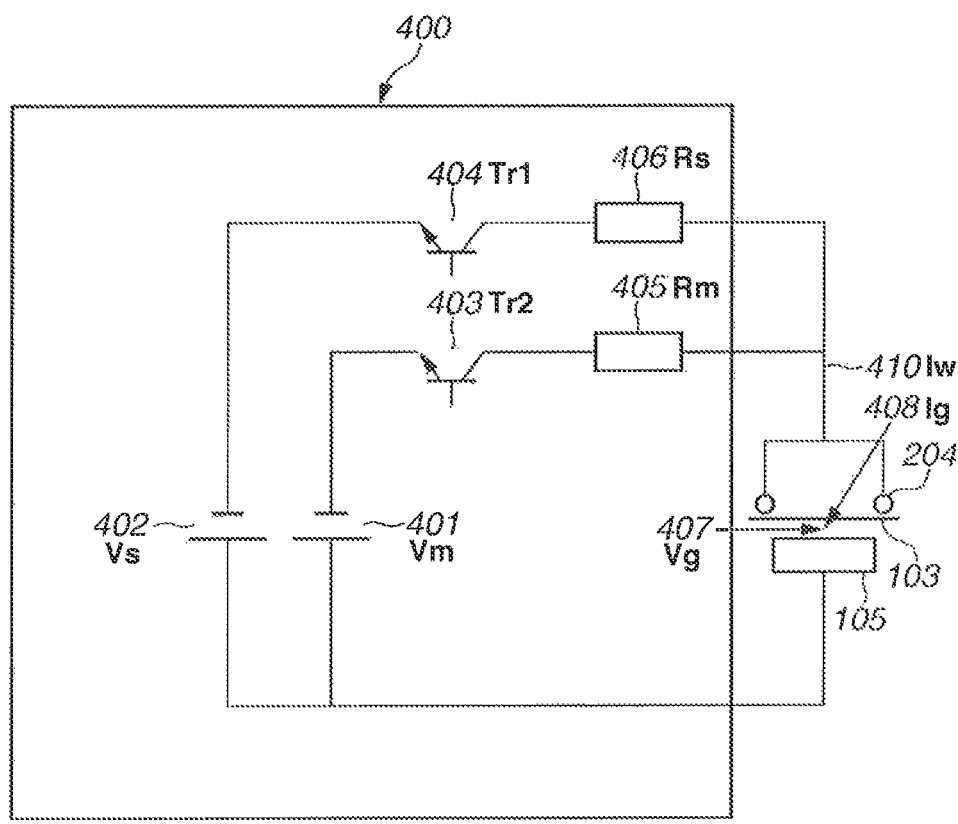
FIG.4
CONVENTIONAL

FIG.13
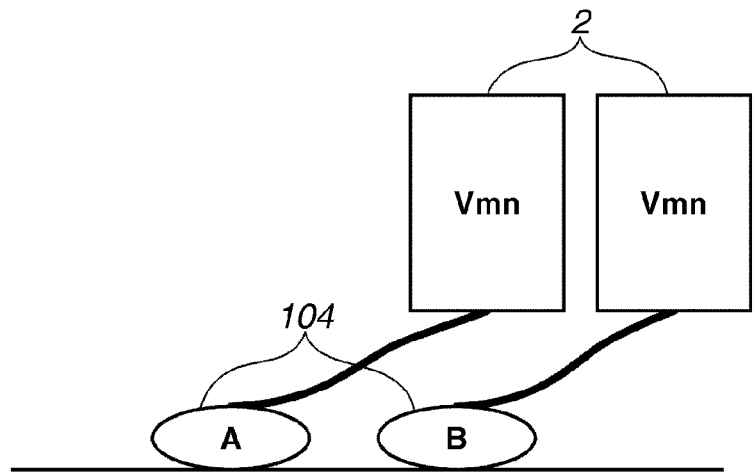
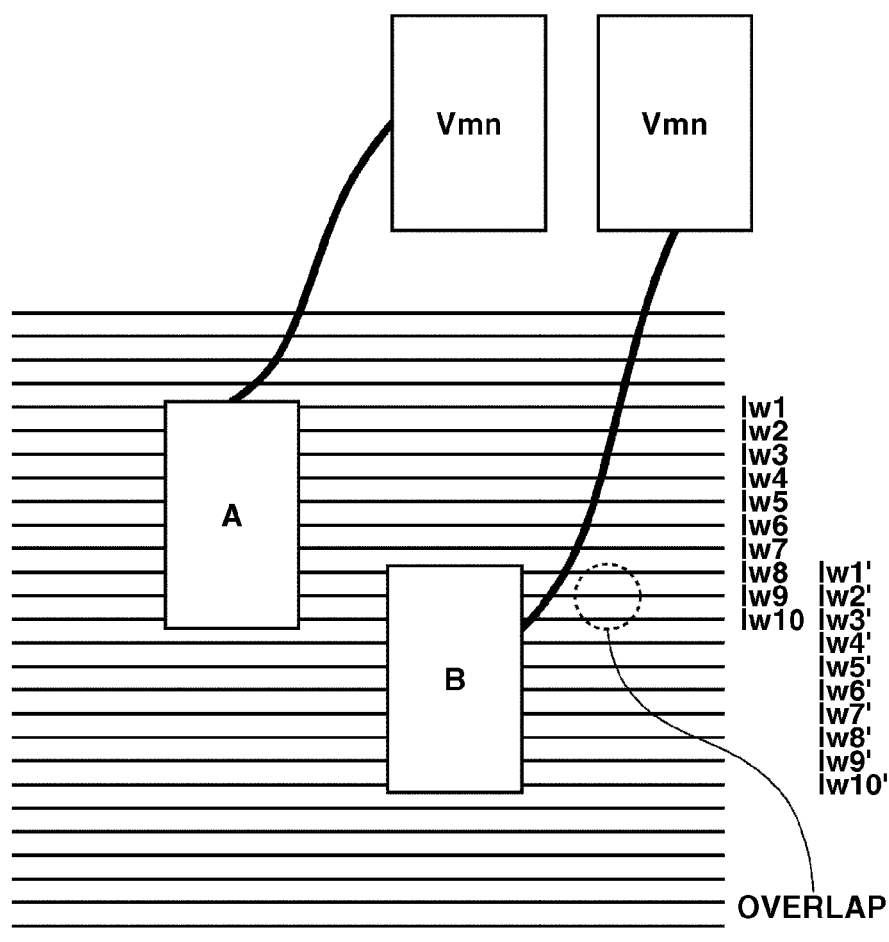

WIRE ELECTRICAL DISCHARGE MACHINING SYSTEM, WIRE ELECTRICAL DISCHARGE MACHINING METHOD, AND WORKPIECE

BACKGROUND OF THE INVENTION

1. Field of the Invention

The present disclosure relates to a wire electrical discharge machining system, a wire electrical discharge machining method, and a workpiece.

2. Description of the Related Art

Up to now, there has been known a wire saw acting as an apparatus for slicing silicon ingot into multiple wafers. There has been also a technique for machining a member to a thin sheet by wire electrical discharge machining.

Japanese Patent Application Laid-Open No. 9-248719, for example, discusses a technique in which power is supplied to three wound wires at one place to perform the electrical discharge machining on a semiconductor ingot.

In a multi-wire electrical discharge machining, appropriately supplying power to all wires at an appropriate position allows an electrical discharge machining which is high in uniformity. However, Japanese Patent Application Laid-Open No. 9-248719 discusses nothing about a method for solving a problem in that, if there is a wire to which power is not appropriately supplied, a groove machined by the wire to which power is not appropriately supplied becomes defective compared with a groove machined by another wire to which power is appropriately supplied.

SUMMARY OF THE INVENTION

The present disclosure provides a mechanism capable of decreasing wires which are not appropriately supplied with power and performing the electrical discharge machining high in uniformity between multiple wires.

According to an aspect disclosed herein, a wire electrical discharge machining system configured to slice a workpiece at an interval of wires arranged side by side at equally spaced intervals includes a traveling unit configured to cause the wires to travel in the same direction and a power feed contact configured to collectively supply a machining power supply to a plurality of the traveling wires, in which two adjacent power feed contacts respectively come into contact with the plurality of the wires supplied with the machining power supply and arranged without being aligned in the direction vertical to the direction in which the wire travels.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 4 illustrates an electric circuit diagram according to a conventional technique.

FIG. 13 illustrates how current flows in the arrangement of the power feed contact.

DESCRIPTION OF THE EMBODIMENTS

Various exemplary embodiments, features, and aspects of the invention will be described in detail below with reference to the drawings.

Figure 1:
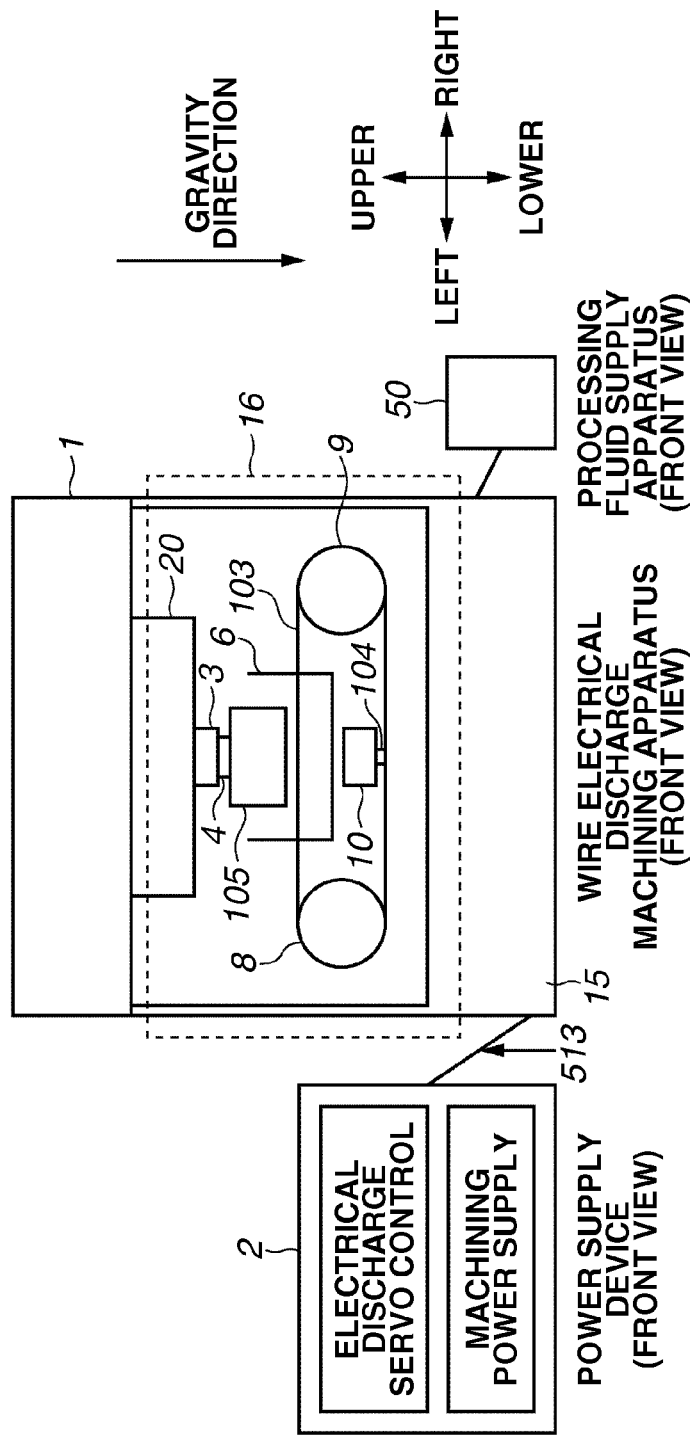
FIG. 1 illustrates a multi-wire electrical discharge machining system.

FIG. 1 is described below. FIG. 1 is an appearance diagram viewed from the front of a multi-wire electrical discharge machine 1 according to an exemplary embodiment disclosed herein. The configuration of each mechanism illustrated in FIG. 1 is an example. It is to be understood that mechanisms may be variously configured according to purposes and applications.

FIG. 1 is a schematic diagram illustrating a configuration of a multi-wire electrical discharge machining system. The multi-wire electrical discharge machining system includes a multi-wire electrical discharge machining apparatus 1, a power supply device 2, and a machining fluid supply apparatus 50.

In the multi-wire electrical discharge machining system, a workpiece is sliced by electrical discharging into a thin leaf at intervals of a plurality of wires arranged side by side.

The multi-wire electrical discharge machining apparatus 1 is provided with a workpiece feeding device 3 driven by a servo motor above a wire 103 to be capable of moving a workpiece 105 upward and downward. In the present disclosure, the workpiece 105 is transferred downward to be subjected to electrical discharge machining between the workpiece 105 and the wire 103. Alternatively, the workpiece feeding device 3 may be provided under the wire 103 to transfer the workpiece 105 upward.

In the power supply device 2, an electrical discharge servo control circuit for controlling a servo motor performs control to keep an electrical discharge gap constant for efficiently generating an electrical discharge according to the state of the electrical discharge, positions the workpiece, and progresses the electrical discharge machining.

A machining power supply circuit (in FIG. 7) supplies an electrical discharge pulse for electrical discharge machining to the wire 103, performs control adapted to a state such as a short-circuit occurring in the electrical discharge gap, and supplies an electrical discharge gap signal to the electrical discharge servo control circuit.

The processing fluid supply apparatus 50 sends processing fluid required for cooling an electrical discharge machining unit and removing a machining chip (waste) to the workpiece 105 and the wire 103 by a pump, removes a machining chip in the processing fluid, controls electric conductivity (1 µS to 250 µS) by ion exchange, and performs control of fluid temperature (in the vicinity of 20° C.). Water is mainly used as the processing fluid, however, electrical discharge machining oil may be also used.

Main rollers 8 and 9 are provided with grooves with predetermined pitches and in predetermined number so that machining can be performed at a desired thickness. Wires of which tension is controlled are supplied from a wire supply bobbin and are wound around the two main rollers by required number and sent to a winding bobbin. Wire speed used is approximately 100 m/min to 900 m/min.

The two main rollers are rotated in conjunction with each other in the same direction and at the same speed to cause a single wire 103 supplied from a wire feeding portion to circulate around the periphery of the two main rollers and to cause a plurality of wires 103 arranged side by side to travel in the same direction (traveling unit).

Figure 8:
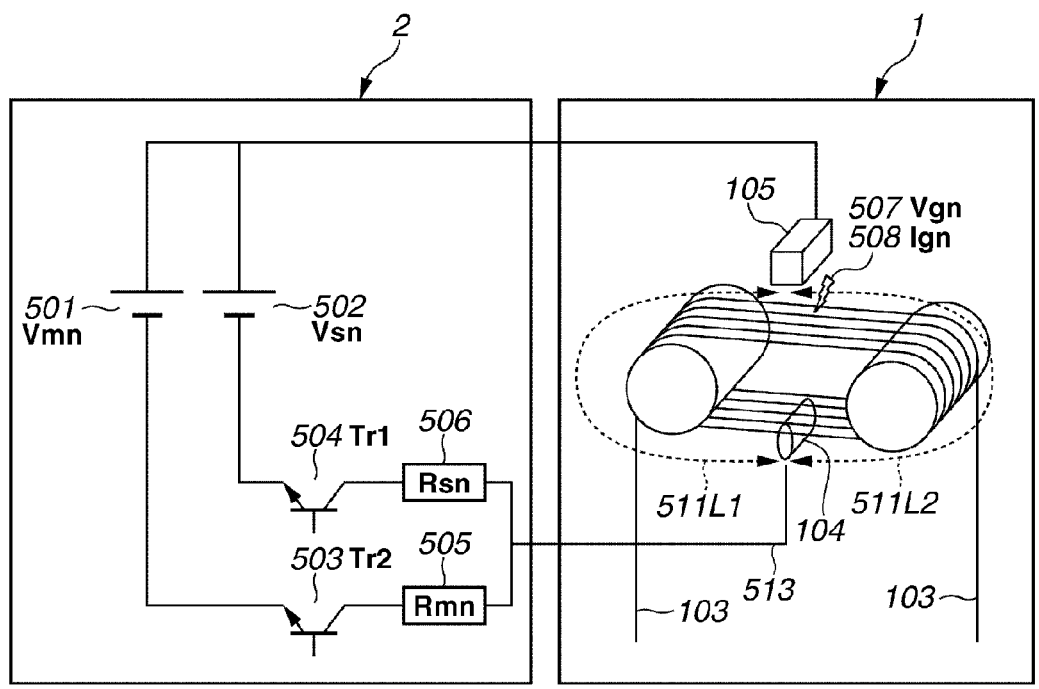
FIG. 8 illustrates a multi-wire electrical discharge machining system.

As illustrated in FIG. 8, the wire 103 that is a single continuous one is fed from a bobbin (not illustrated), spirally wound around the outside of the main rollers by a multiple number of turns (about 2000 turns at maximum) while being fitted into a guide groove (not illustrated) on the outer periphery of the main rollers, and then reeled up by a bobbin (not illustrated).

The multi-wire electrical discharge machining apparatus 1 is connected to the power supply device 2 via an electric wire 513 and operated by power supplied from the power supply device 2.

As illustrated in FIG. 1, the multi-wire electrical discharge machining apparatus 1 includes a block 15 functioning as a platform of the multi-wire electrical discharge machining apparatus 1, a block 20 provided above the block 15, the workpiece feeding device 3, a bonding portion 4, a silicon ingot 105, a processing fluid bath 6, the main roller 8, the wire 103, the main roller 9, a power supply unit 10, and a power feed contact 104.

Figure 2:
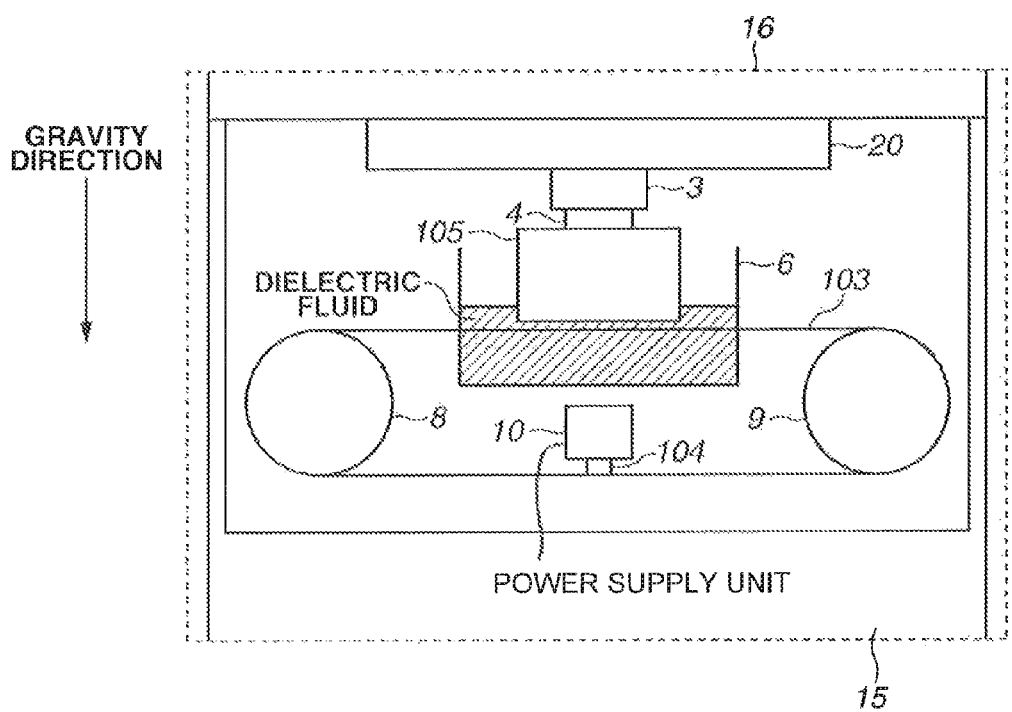
FIG. 2 illustrates a multi-wire electrical discharge machining apparatus.

FIG. 2 is described below. FIG. 2 is an enlarged view in a frame of a dotted line 16 illustrated in FIG. 1.

The wire 103 is wound around the main rollers 8 and 9 by a plurality of turns and aligned at a predetermined pitch according to grooves engraved in the main roller. The main roller is configured such that metal is used in its center and the outside of the roller is covered with resin.

Figure 3:
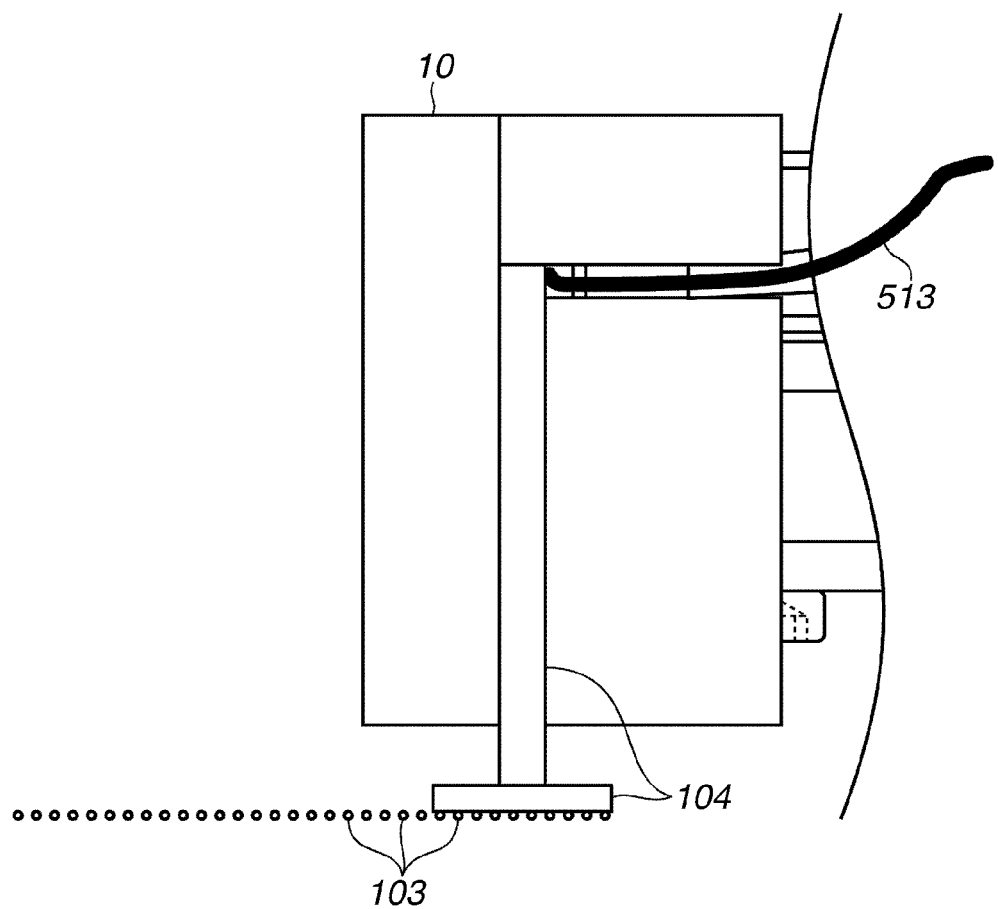
FIG. 3 illustrates a power feed contact.

The power feed contact 104 for supplying an electrical discharge pulse from a machining power supply is provided under the center portion between the main guide rollers to be brought into contact with ten wires 103 (refer to FIG. 3).

The power feed contact 104 is arranged in a position where the wires become equal in length to each other from both ends of the silicon ingot 105. A strong resistance to mechanical wear and high conductivity are required of the power feed contact 104. Hard metal is used for the power feed contact 104.

The silicon ingot 105 is arranged over the center portion between the main rollers, fixed to the workpiece feeding device 3, and machined while being moved upward and downward.

The processing fluid bath 6 is provided at the center portion between the main rollers. The wire 103 and the silicon ingot 105 are immersed in the processing fluid bath 6 to cool the electrical discharge machining portion and remove machining chips.

As illustrated in FIG. 3, a single power feed contact 104 is in contact with ten wires 103. Needless to say, the number of wires for each power feed contact 104 and the total number of the power feed contacts 104 may be increased if needed.

The block 20 is bonded to the workpiece feeding device 3. The workpiece feeding device 3 adheres (being bonded) to the silicon ingot (a workpiece) 105 by the bonding portion 4.

In the present exemplary embodiment, the silicon ingot 105 is cited as an example of a processing material (a workpiece) in the following description.

Any material may be used for the bonding portion 4 provided that the bonding portion 4 is used for bonding the workpiece feeding device 3 to the silicon ingot 105 (the workpiece). For example, a conductive adhesive is used.

The workpiece feeding device 3 is the one that is equipped with a mechanism for moving the silicon ingot 105 bonded by the bonding portion 4 upward and downward. The workpiece feeding device 3 moves downward to allow the silicon ingot 105 to approach the wire 103.

The processing fluid bath 6 is a container for storing a processing fluid. The processing fluid is deionized water high in resistance, for example. The processing fluid is provided between the wire 103 and the silicon ingot 105 to generate an electrical discharge between the wire 103 and the silicon ingot 105, allowing the silicon ingot 105 to be cut.

A plurality of grooves for fitting the wire 103 is formed in the main rollers 8 and 9 and the wire 103 is fitted to the grooves. The main rollers 8 and 9 are rotated clockwise or counter-clockwise to cause the wire 103 to travel.

As illustrated in FIG. 2, the wire 103 is fixed to the main rollers 8 and 9 to form an array of wires on the upper and lower sides of the main rollers 8 and 9.

The wire 103 is a conductor. The power feed contact 104 of the power supply unit 10 to which the power supply device 2 supplies voltage comes into contact with the wire 103 to cause the power feed contact 104 to apply the supplied voltage to the wire 103. (The power feed contact 104 applies voltage to the wire 103.)

An electrical discharge is generated between the wire 103 and the silicon ingot 105 to cut the silicon ingot 105 (performs the electrical discharge machining), allowing forming silicon in a thin leaf form (silicon wafer).

FIG. 3 is described below. FIG. 3 is an enlarged view of the power feed contact 104. The power feed contact 104 (one piece) is in contact with ten wires 103. A distance between the wires 103 (wire pitch) is approximately 0.3 mm (300 μm).

FIG. 4 is described below. FIG. 4 illustrates an electric circuit 400 for a conventional system in which an electric discharge current is individually supplied to each wire.

A machining power supply (Vm) 401 supplies current required for the electrical discharge machining. The machining power supply (Vm) 401 is capable of setting a machining voltage to any voltage from 60 V to 150 V.

A machining power supply (Vs) 402 is a voltage set to induce electrical discharge. The machining power supply (Vs) 402 is also used for monitoring an interelectrode voltage (interelectrode current) between the wire and the workpiece. The machining power supply (Vs) 402 can be set to any voltage from 60 V to 300 V. A transistor (Tr2) 403 switches between ON (conduction) state and OFF (non-conduction) state of the machining power supply (Vm) 401 by switching.

A transistor (Tr1) 404 switches ON (conduction) and OFF (non-conduction) states of the machining power supply (Vs) 402 by switching.

A current limiting resistor (Rm) 405 limits a wire current (Iw) for each wire and a discharge current (Ig) by setting a fixed resistance value. The current limiting resistor (Rm) 405 can be set to any resistance value from 1Ω to 100Ω. More specifically, if Vm=60 V, Vg=30 V, Rm=10.52, Iw=(60 V−30 V)/10Ω=3 A.

In the above calculation equation, a voltage drop between the machining power supply (Vm) 401 and a power feed point is taken as 30 V, however, a voltage drop between the power feed point and the electrical discharge point due to a wire resistance (Rw) is not taken into consideration.

In the conventional individual power supply system, the wire current (Iw) is determined by the machining current limiting resistor (Rm), so that the wire resistance Rw has such a relationship that Rm>Rw to obtain desired wire current (Iw) and electrical discharge current (Ig) for each wire.

A current limiting resistor (Rs) 406 limits induction current which induces electrical discharge by setting a fixed resistance value. The current limiting resistor Rs can be set to any resistance value from 1Ω to 100Ω.

An interelectrode voltage (Vg) 407 is applied across the wire 103 and the workpiece 105 during the electrical discharge.

An interelectrode current (Ig) 408 is a current flowing between the wire 103 and the workpiece 105 during electrical discharge.

A wire current (Iw) 410 is supplied individually to each wire.

Figure 5:
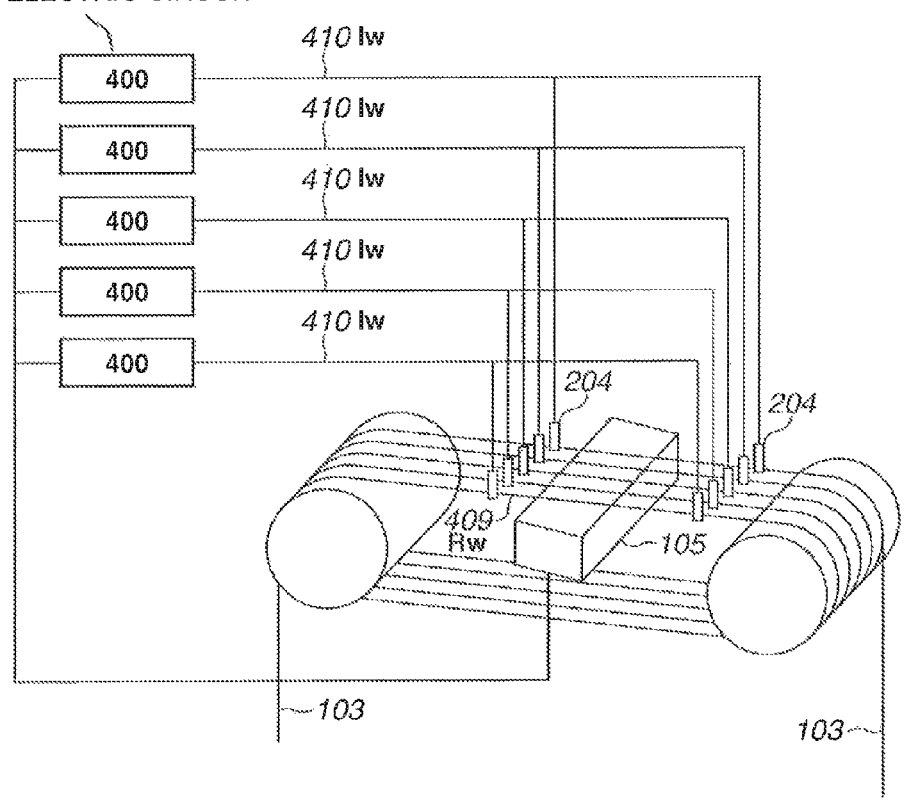
FIG. 5 illustrates a multi-wire electrical discharge machining apparatus according to a conventional technique.

FIG. 5 is described below. FIG. 5 is a schematic diagram for a conventional system illustrating that the electric circuit 400 for individually supplying the electrical discharge current to each wire supplies power to a plurality of wires.

A wire resistance (Rw) 409 indicates a resistance for each wire.

An individual power feed contact 204 provided at two places in the vicinity of both ends of the silicon ingot 105 supplies an electrical discharge pulse to perform the electrical discharge machining.

The individual power feed contacts 204 are connected to the electric circuits 400 equal in number to the wires 103 wound around.

Figure 6:
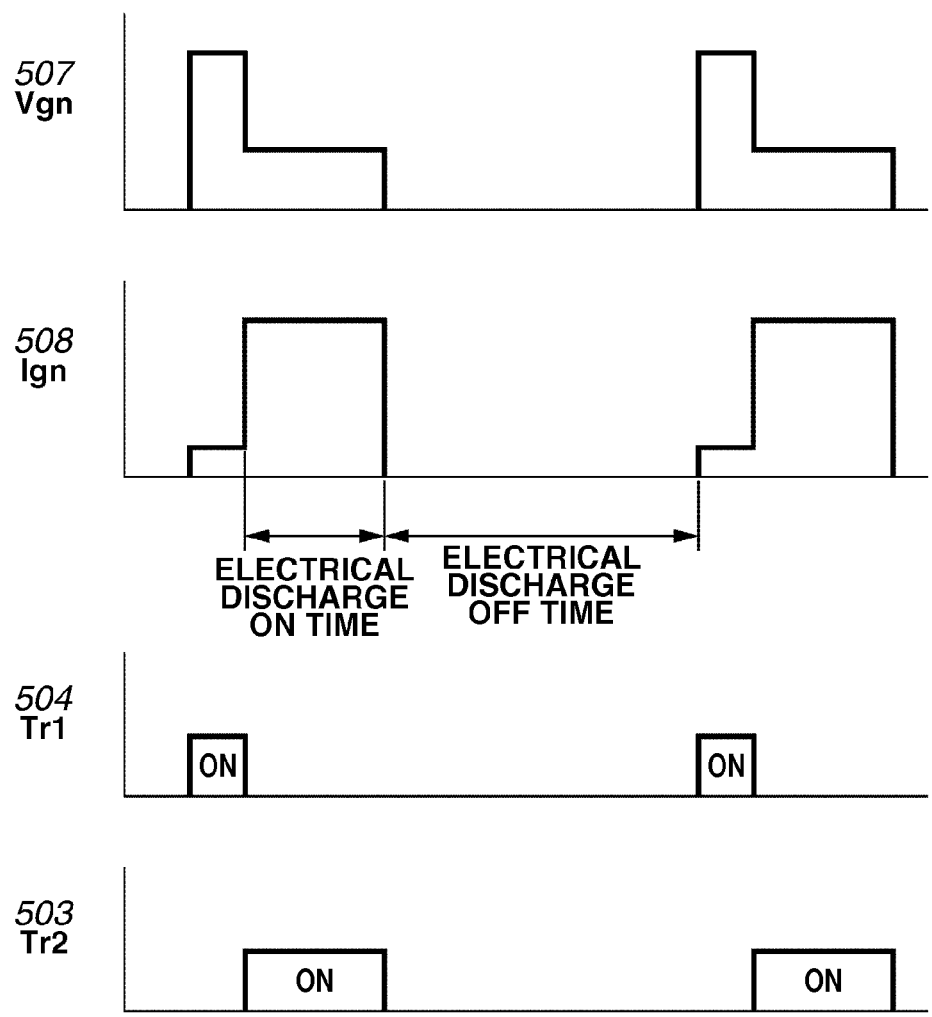
FIG. 6 illustrates an electrical discharge pulse.

FIG. 6 illustrates a change in an interelectrode voltage (Vgn) and an interelectrode current (Ign) and an ON/OFF operation of the transistors Tr1 and Tr2 (timing chart). A horizontal axis of the graph indicates time.

A transistor Tr1 503 is turned on to apply voltage. At this point, a gap between the wire 103 and the workpiece 105 is insulated, so that little interelectrode current flows. Thereafter, when electrical discharge starts, the interelectrode voltage Vgn is lowered to detect the electrical discharge, turning on the transistor Tr2 to obtain a large interelectrode current. The transistor Tr2 is turned off after a predetermined time elapses. After a predetermined time elapses since transistor Tr2 is turned off, a series of operations is repeated again.

Figure 7:
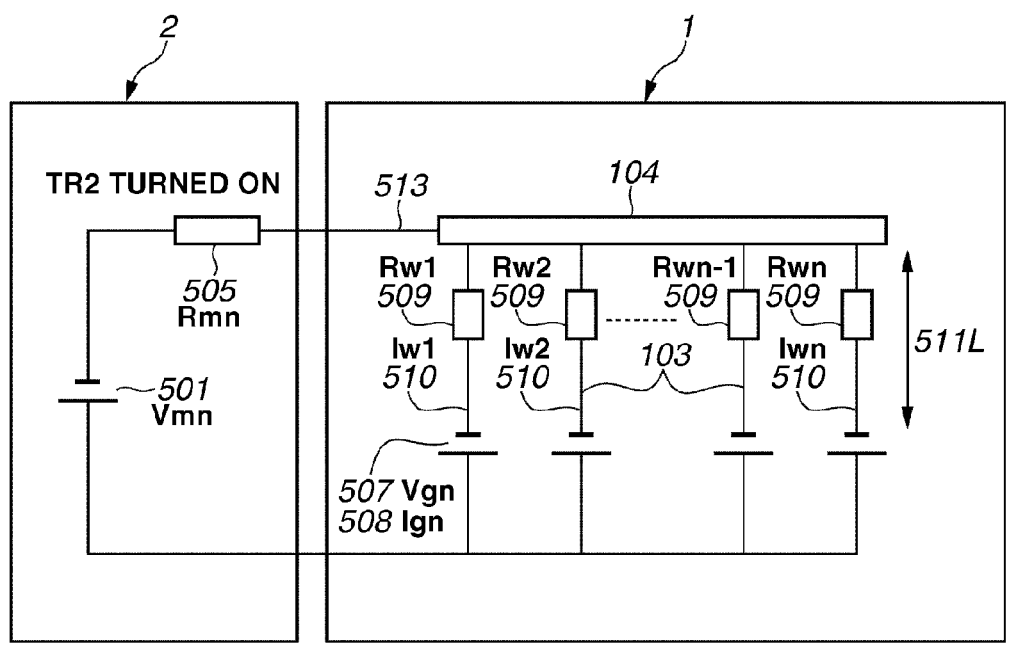
FIG. 7 illustrates an electric circuit diagram.

FIG. 7 is described below. FIG. 7 is a circuit diagram of an electric circuit 2 in a collective power supply which collectively supplies the electrical discharge current to a plurality of wires (ten wires) according to the present disclosure. FIG. 7 indicates a state where the electrical discharge current flows.

FIG. 7 illustrates an equivalent circuit to the electric circuit 2 in FIG. 8. If the conventional electric circuit 400 illustrated in FIG. 4 is directly introduced to an electric circuit which collectively supplies the electrical discharge current to a plurality of wires (ten wires), a current limiting resistor with a resistance value determined by dividing the current limiting resistor Rm by 10 (the number of turns of the wire wound around the main rollers 8 and 9) has only to be arranged between the machining power supply and the power feed point instead of the current limiting resistor Rm 405 to control the electrical discharge current between the machining power supply and the power feed point so that the electrical discharge current of the sum (tenfold) of the electrical discharge current is supplied to a plurality of wires (ten wires).

A case is described below in which the current limiting resistor Rm/10 wires having thus fixed resistance is arranged between the machining power supply and the power feed contact.

If the electric discharge occurs uniformly and at the same time between all of the ten wires and the workpiece, the electrical discharge current is evenly dispersed to the ten wires and supplied between each wire and the workpiece according to the fixed resistance value (Rm/ten wires), so that supply of excessive electrical discharge current does not become problem.

However, if the electric discharge does not occur uniformly and at the same time between all of the ten wires and the workpiece, the electrical discharge current according to the fixed resistance value (Rm/ten wires) is intensively supplied between the wire and the workpiece which are in an electrical discharge state, which causes supply of excessive electrical discharge current to become problem. More specifically, if only one wire out of ten is in an electrical discharge state, a wire current being ten times the wire current to be originally supplied to one wire and the workpiece is supplied to the wire which are in an electrical discharge state and the workpiece, so that the wire is broken.

Unlike the conventional current limiting resistor in which a resistance value is fixed to a predetermined value, a resistance Rmn 505 as disclosed herein has a control mechanism capable of varying a resistance value according to the number of wires which are in the electrical discharge state even if only one wire out of ten is in the electrical discharge state.

The resistance Rmn 505 according to the present disclosure is varied within a resistance value smaller enough than a wire resistance Rwn 509 to make the wire resistance Rwn 509 more dominant than the resistance Rmn 505 in limiting the electrical discharge current, allowing substantially neglecting the influence of the resistance Rmn 505.

This means that there is no need to provide the resistor which performs electrical discharge and limits the lower limit of the current between a machining power supply portion 501 and the power feed contact 104. In other words, the resistance Rmn 505 has only to be made smaller than a resistance simply divided by ten wires (the number of turns of the wire wound around the main rollers 8 and 9).

In other words, using an impedance being the resistance Rwn 509 of each wire stably supplies an electrical discharge current Iwn of each wire, so that the electrical discharge current does not converge.

The resistance Rwn 509 indicates a resistance of the wire for each wire. The resistance between the power feed contact 104 and the electrical discharge portion is the resistance of one wire that comes into contact with the power feed contact 104 and travels.

For example, each wire resistance is respectively taken as Rw1, Rw2, . . . , and Rw10 in a case where power is collectively supplied to ten wires (the number of turns of the wire wound around the main rollers 8 and 9 is ten).

Unlike the conventional system, the resistance Rwn instead of the resistance Rmn is taken as a resistance for limiting the wire current (Iwn) and the electrical discharge current (Ign) for each wire to allow limiting the wire current (Iwn) and the electrical discharge current (Ign) for each wire. In other words, a distance (length L) between the power feed point (the power feed contact) and the electrical discharge point (the electrical discharge portion) is varied to allow setting a wire resistance to any resistance. Specifically, if Vmn=60 V, Vgn=30 V, and Rwn=10Ω, Iwn (Ign)=(60 V−30 V)/10Ω=3 A.

In the above calculation equation, a voltage drop due to the wire resistance (Rwn) between the power feed point and the electrical discharge point is taken as 30 V, however, the above calculation equation does not consider a voltage drop between the power feed point and the electrical discharge point due to the resistance (Rmn) which causes a voltage drop between the machining power supply and the power feed point.

In other words, the wire current Iwn is determined by the resistance Rmn in the collective power supply system according to the present disclosure, so that the resistance Rmn which causes a voltage drop between the machining power supply and the power feed point is set to have a relationship of Rmn<Rwn to obtain the desired wire current (Iwn) and the electrical discharge current (Ign) for each wire.

The wire resistance Rmn of each wire can be determined from three parameters: (1) an electric resistance $\rho$ of a wire material; (2) a cross-section area B of the wire; and (3) a length L of the wire using an equation of Rwn=$(\rho \times B)/L$.

A machining power supply portion (Vmn) 501 is set to a machining voltage for supplying current required for the electrical discharge machining. The Vmn may be set to any voltage. Further, amount of supply of electrical discharge current is larger than that of the conventional system, so that the Vmn supplies a larger power than the machining power supply 401.

The machining power supply portion 501 supplies the machining power supply (Vmn) to the power feed contact 104.

A machining power supply portion (Vsn) 502 is a voltage set for inducing electrical discharge. Furthermore, the machining power supply portion 502 is used for monitoring a interelectrode voltage (a interelectrode current) between the wire and the workpiece. The Vsn may be set to any voltage. Further, amount of supply of electrical discharge current is larger than that of the conventional system, so that the Vsn supplies a larger power than the machining power supply 402.

The machining power supply portion 502 supplies the machining power supply (Vsn) to the power feed contact 104.

A transistor (Tr2) 503 switches between ON (conduction) state and OFF (non-conduction) state of the machining power supply Vmn by switching.

A transistor (Tr1) 504 turns the machining power supply Vsn ON (conduction) and OFF (non-conduction) by switching.

A interelectrode voltage (Vgn) 507 is an electrical discharge voltage applied between the wire 103 and the workpiece 105 during electrical discharge.

For example, electrical discharge voltages collectively applied to ten wires are taken as Vg1, Vg2, . . . , and V10.

A portion where the interelectrode voltage is applied between the wire 103 and the workpiece 105 by the electrical discharge is an electrical discharge portion. In the electrical discharge portion, the machining power supply in which a plurality of traveling wires come into contact with the power feed contact to collectively supply power to the plurality of traveling wires is electrically discharged to the workpiece.

A interelectrode current (Ign) 508 is the one that flows between the wire 103 and the workpiece 105 during electrical discharge.

For example, each electrical discharge currents is respectively taken as Ig1, Ig2, . . . , and Ig10 in a case where power is collectively supplied to ten wires.

A portion where the interelectrode current flows between the wire 103 and the workpiece 105 by the electrical discharge is an electrical discharge portion. In the electrical discharge portion, the machining power supply in which a plurality of traveling wires come into contact with the power feed contact to collectively supply power to the plurality of traveling wires is electrically discharged to the workpiece.

A wire current (Iwn) 510 is individually supplied to each wire. For example, each wire currents is respectively taken as Iw1, Iw2, . . . , and Iw10 in a case where power is collectively supplied to ten wires.

A distance (L) 511 is distance L between the power feed point and the electrical discharge point, in other words, a length of the wire between the power feed point and the electrical discharge point.

FIG. 8 is described below. FIG. 8 is a schematic diagram illustrating that an electric circuit 2 for collectively supplying the electrical discharge current to a plurality of wires (ten wires) collectively supplies power to the plurality of wires.

The power feed contact 104 collectively comes into contact with a plurality of traveling wires. An electrical discharge pulse is applied from one power feed contact 104 provided in a position opposing the silicon ingot 105 to perform the electrical discharge machining.

One electric circuit 2 is connected to number of wires 103 (ten wires) wound around the main rollers.

A description is given below with reference to the arrangement in FIG. 8. As illustrated in FIG. 8, the current flowing from the power feed point (the position where the power feed contact 104 comes into contact with the wire 103) to the electrical discharge point (between the wire 103 and the workpiece 105) flows in two directions of the left and right main rollers, so that there exist wire resistances with respect to each direction.

A length (distance) between the power feed point and the electrical discharge point in a case where current flows in the direction of the left main roller is expressed by 511 L1. The wire resistance determined in the length L1 is taken as Rw1a.

A length (distance) between the electrical discharge point and the power feed point in a case where current flows in the direction of the right main roller is expressed by 511 L2. The wire resistance determined in the length of L2 is taken as Rw1b.

A length of the wire 103 with one turn wound around the main rollers 8 and 9 is taken as two meters.

The power feed contact 104 is arranged in the position the distance of which is equal to approximately half of the length of the wire 103 with one turn wound around the main rollers 8 and 9, so that the distance between the electrical discharge point and the power feed point (wire length L) is one meter. Therefore, a distance of the wire traveling from the power feed contact 104 to electrical discharge portion is longer than 0.5 meters.

The wire 103 mainly contains iron and is 0.12 mm in diameter (cross-section area=$0.06 \times 0.06 \times \pi$ mm2). If the wire resistances Rw1a and Rw1b are taken as 20Ω each because the wire resistances Rw1a and Rw1b are equal in length (L1=L2=1 m), the combined resistance of Rw1a and Rw1b of one wire, with one turn wound around the main rollers 8 and 9, is equal to approximately 10Ω.

As illustrated in FIG. 8, it is advantageous to arrange the power feed contact 104 in a position where the lengths L1 and L2 are equal to each other to make the wire resistances by the lengths L1 and L2 equal to each other, however, there is no problem in particular if a difference in length between the lengths L1 and L2 is approximately 10% (for example, L1=1 m and L2=1.1 m).

If the electrical discharge voltages Vg1 to Vg10 are nearly equal to one another, the machining power supply Vmn is applied across the respective wire resistances Rw1 to Rw10, so that all the wire currents Iw1 to Iw10 are equal to one another.

The machining power supply Vmn is determined from a voltage drop (Rw1×Iw1) in the wire resistance and electrical discharge (Vgn).

A voltage drop between the power feed contact 104 and the electrical discharge portion is attributable to the traveling wire resistance.

Rw1=10Ω (the resistance between the power feed contact 104 and the electrical discharge portion)

Iw1=3 A

If Vgn=30 V, Vmn is given by the following equation.

$$Vmn = 10\Omega 3\,A + 30\,V = 60\,V.$$

Therefore, a voltage drop between the power feed contact 104 and the electrical discharge portion is greater than 10 V. Accordingly, a resistance between the power feed contact 104 and the electrical discharge portion is greater than one Ω.

A voltage drop in the wire resistance based on wire parameters may be set according to the equation of $Rwn=(\rho \times B)/L$.

A wire resistance Rmn is calculated in a case where the electric discharge occurs uniformly and at the same time between all ten wires and the workpiece. If all wires are in an electrical discharge state and a wire current Iw1 of 3 A flows to the ten wires, a machining current of 10 wires×3 A=30 A in total is required between the machining power supply and the power feed point. If a voltage drop between the machining power supply and the power feed point is 1/100 of the machining power supply Vmn (0.6 V), the wire resistance Rmn is given by the following equation.

A voltage drop between the machining power supply portion and the power feed contact 104 is smaller than 1 V.

Therefore, the voltage drop between the machining power supply portion and the power feed contact 104 is smaller than the voltage drop between the power feed contact 104 and the electrical discharge portion.

Rmn=0.6 V/30 A=0.02Ω (the resistance between the machining power supply portion 501 and the power feed contact 104).

Therefore, the resistance between the machining power supply portion 501 and the power feed contact 104 is smaller than 0.1Ω.

Therefore, the resistance between the machining power supply portion 501 and the power feed contact 104 is smaller than the resistance between the power feed contact 104 and the electrical discharge portion.

Therefore, the ratio of the voltage drop between the machining power supply portion 501 and the power feed contact 104 to the voltage drop between the power feed contact 104 and the electrical discharge portion is equal to or more than 10 times.

Therefore, the ratio of the resistance between the machining power supply portion 501 and the power feed contact 104 to the resistance between the power feed contact 104 and the electrical discharge portion is equal to or more than 10 times.

A machining current of the ten wires in consideration of the wire resistance Rmn is obtained from (60 V−30 V)/((10Ω/10 wires)+0.02Ω)=29.41 A. The machining current per wire is 2.941 A.

If the electric discharge does not occur uniformly and at the same time between all ten wires and the workpiece, and even if one-wire current flows, the machining current per wire is (60 V−30 V)/(10Ω+0.02Ω)=2.994 A which is not significantly different from that in the case where the electric discharge occurs uniformly and at the same time between all ten wires and the workpiece.

A further effect can be obtained as follows. If power is collectively supplied to a plurality of wires N (with N-turn wound around the main rollers 8 and 9) at one place (collectively), the machining speed is made smaller to 1/N of a machining speed than that in individually supplying power to a single wire. According to the present disclosure, even if power is collectively supplied to N wires at one place (collectively), the machining speed equivalent to that in individually supplying power to a single wire can be maintained.

Figure 9:
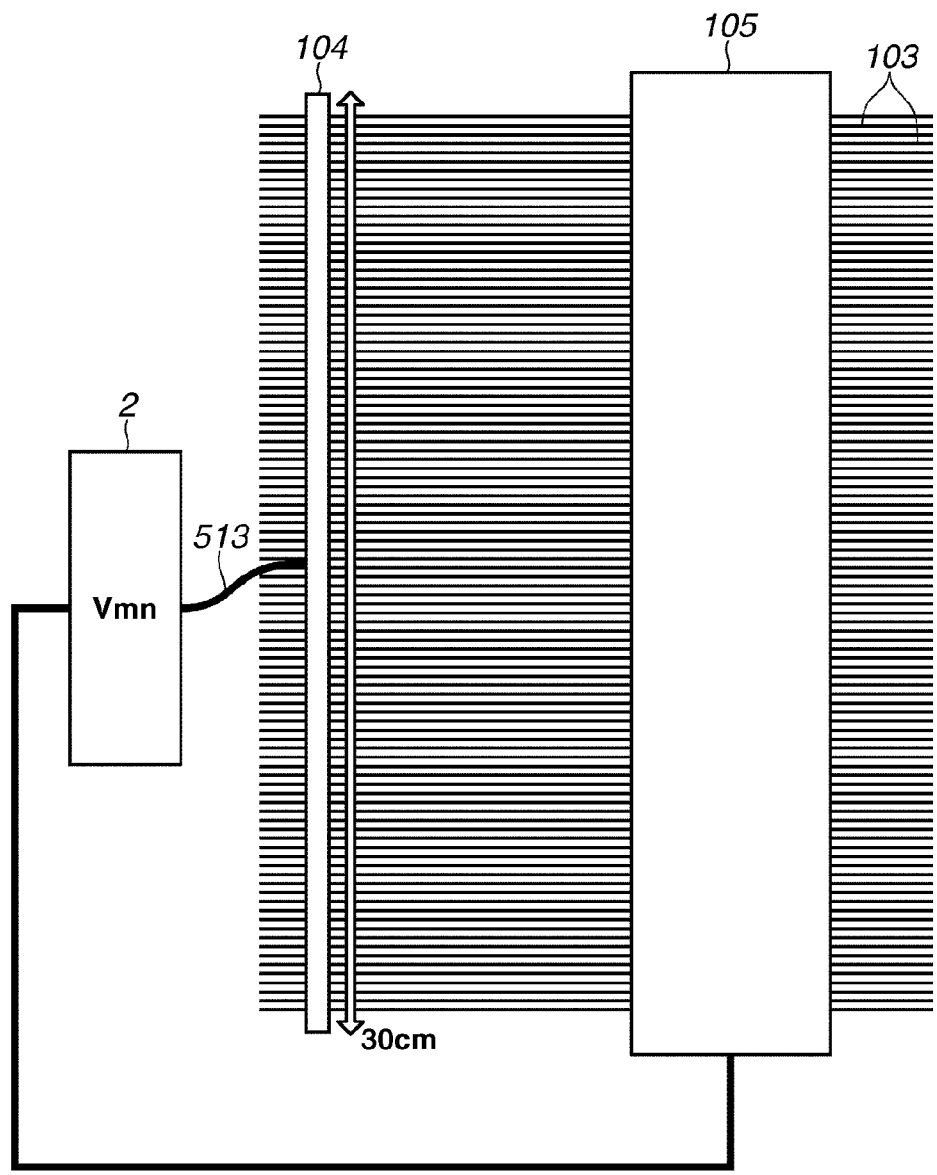
FIG. 9 illustrates an example of an arrangement of the power feed contact.

FIG. 9 illustrates an arrangement of a power feed contact for collectively supplying power to hundred wires. In this case, a single power feed contact is approximately 30 cm in length.

In the multi-wire electrical discharge machining system according to the present disclosure, the total current of machining current supplied from one machining power supply and one power feed contact to a wire is proportional not to the number of wires with which the power feed contact comes into contact but to the number of wires in which the electric discharge occurs uniformly and at the same time.

As described in FIG. 8, if the electric discharge occurs uniformly and at the same time between ten wires and the workpiece, the total machining current supplied to the ten wires in consideration of the wire resistance Rmn is obtained from (60 V−30 V)/((10Ω/10 wires)+0.02Ω)=29.41 A. The machining current per wire is 2.941 A.

Therefore, if the electric discharge occurs uniformly and at the same time between all of 100 wires and the workpiece, the total machining current (maximum) supplied to the 100 wires in consideration of the wire resistance Rmn is obtained from (60 V−30 V)/((10Ω/100 wires)+0.02Ω)=250 A. The machining current per wire is 2.5 A.

Thus, if power is collectively supplied from one machining power supply and one power feed contact to the 100 wires and the electric discharge occurs uniformly and at the same time between the 100 wires and the workpiece, the machining power supply needs to have a large supply capability of 60 V×250 A=15 kW.

If power is collectively supplied from one machining power supply and one power feed contact to the 100 wires and the electric discharge occurs uniformly and at the same time only between ten wires and the workpiece, the machining power supply needs to have a supply capability of 60 V×29.41 A=1.7 kW. This increases a range of fluctuation of the total current supplied to the wires in which the electric discharge occurs uniformly and at the same time between wires and the workpiece, increasing the load of the machining power supply for controlling the total current.

Figure 10:
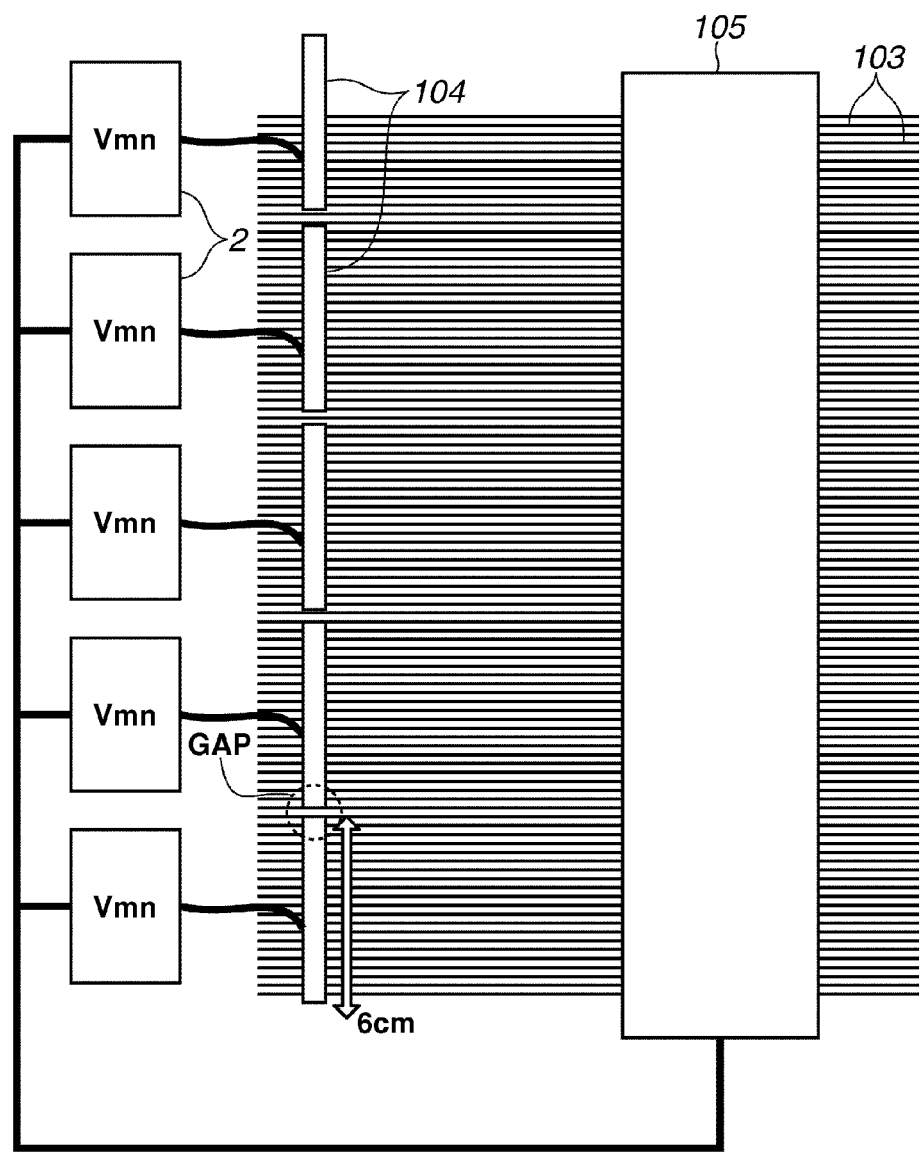
FIG. 10 illustrates an example of an arrangement of the power feed contact.

FIG. 10 illustrates that power feed contacts, each of which collectively supplies power to 20 wires, are arranged side by side. In this case, a single power feed contact is approximately 6 cm in length.

If the electric discharge occurs uniformly and at the same time between all of the 20 wires and the workpiece, the total machining current (maximum) supplied to the 100 wires in consideration of the wire resistance Rmn is obtained from (60 V−30 V)/((10Ω/20 wires)+0.02Ω)=57.69 A. The machining current per wire is 2.8846 A.

Thus, if power is collectively supplied from one machining power supply and one power feed contact to the 20 wires and the electric discharge occurs uniformly and at the same time between the 20 wires and the workpiece, a supply capability of 60 V×57.69 A=3.4 kW is required. As compared with the case of FIG. 9, the machining power supply does not need a larger supply capability and a range of fluctuation is made smaller in variation of the total current supplied to the wires in which the electric discharge occurs uniformly and at the same time between wires and the workpiece, decreasing the load of the machining power supply for controlling the total current.

It is appropriate that current per unit of the machining power supply is several tens of A in consideration of electrical protection in a case where short-circuit occurs in a cable on the load side of the machining power supply. Since the maximum value of current per wire can be restricted by the resistance Rwn of each wire, if current flowing one wire is taken as 3 A, for example, in a case where the supply current of the machining power supply supplying power to one power feed contact is 30 A, the number of wires collectively supplied with power is limited to equal to or less than 10, or in a case where the machining power supply whose supply current is 60 A is used, the number of wires collectively supplied with power is limited to 20 or less, so that the supply capability of the machining power supply is not exceeded.

Therefore, if 100 wires are supplied with power, the machining power supplies equal in supply capability to each other are taken as five or ten units and five to ten power feed contacts corresponding to the machining power supplies are provided to allow maintaining the relationship with the supply capability of the machining power supply (the machining power supply portion individually supplying machining power supply to each power feed contact).

Figure 11:
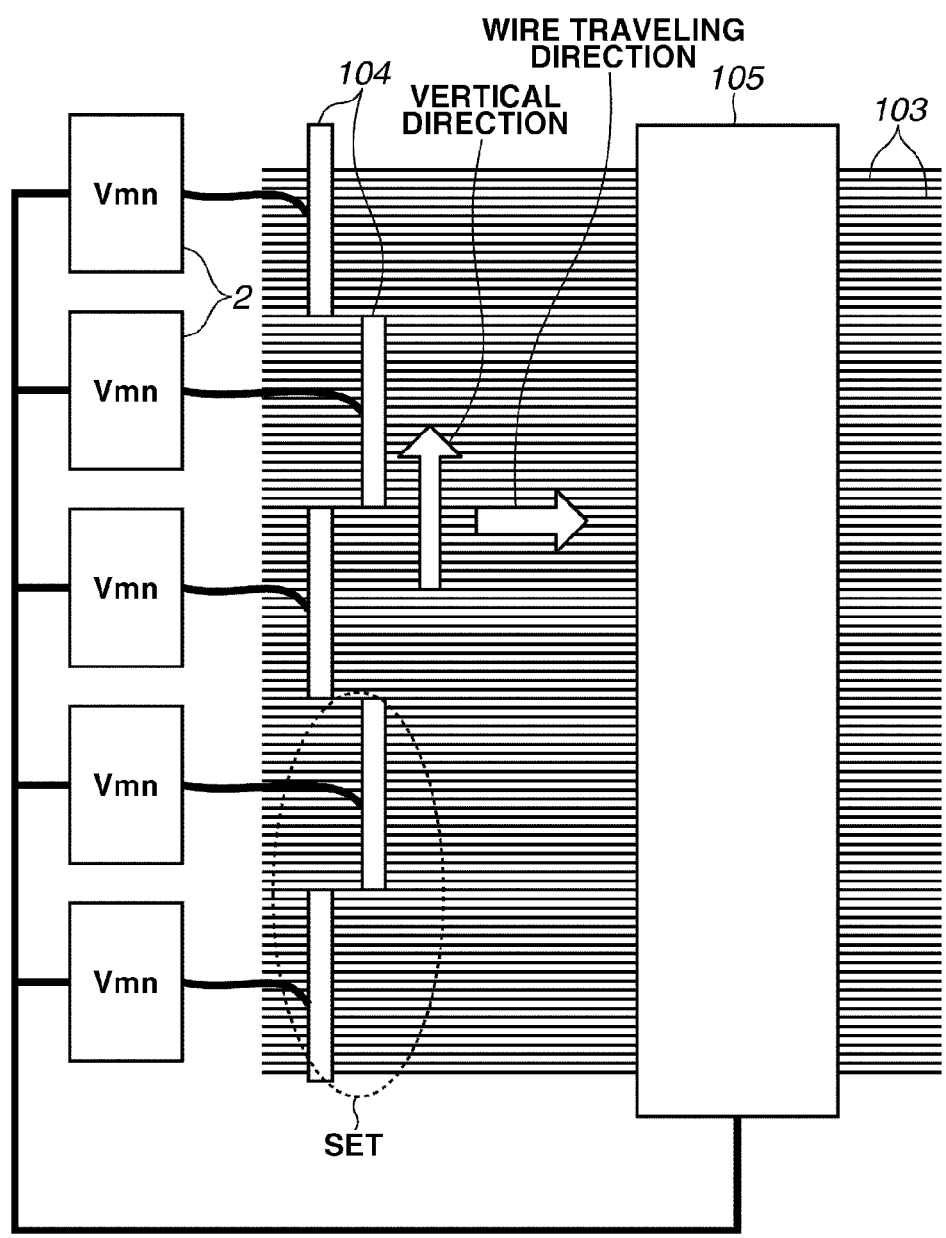
FIG. 11 illustrates an example of an arrangement of the power feed contact.

FIG. 11 illustrates that power feed contacts, each of which collectively supplies power to 20 wires, are arranged side by side.

The power feed contacts are arranged side by side as illustrated in FIG. 10 to produce gaps between the adjacent (neighbor) power feed contacts. The distance between the wires arranged side by side (pitch) is approximately 0.3 mm (300 μm) according to the present disclosure. A problem arises in that a wire traveling on the gap between the adjacent power feed contacts is not supplied with power. Therefore, as illustrated in FIG. 11, this problem can be solved by arranging the adjacent power feed contacts in a manner not aligning in the direction vertical to the direction in which the wire travels.

Furthermore, a set of the power feed contacts arranged in a manner not aligning is repetitively arranged in the direction vertical to the direction in which the wire travels to decrease a width of space produced by arranging the power feed contact with extended, eliminating the need for ensuring the space required for arranging the power feed contacts side by side on the wire surface, which enables the multi-wire electrical discharge machining apparatus to be compactly designed.

Figure 12:
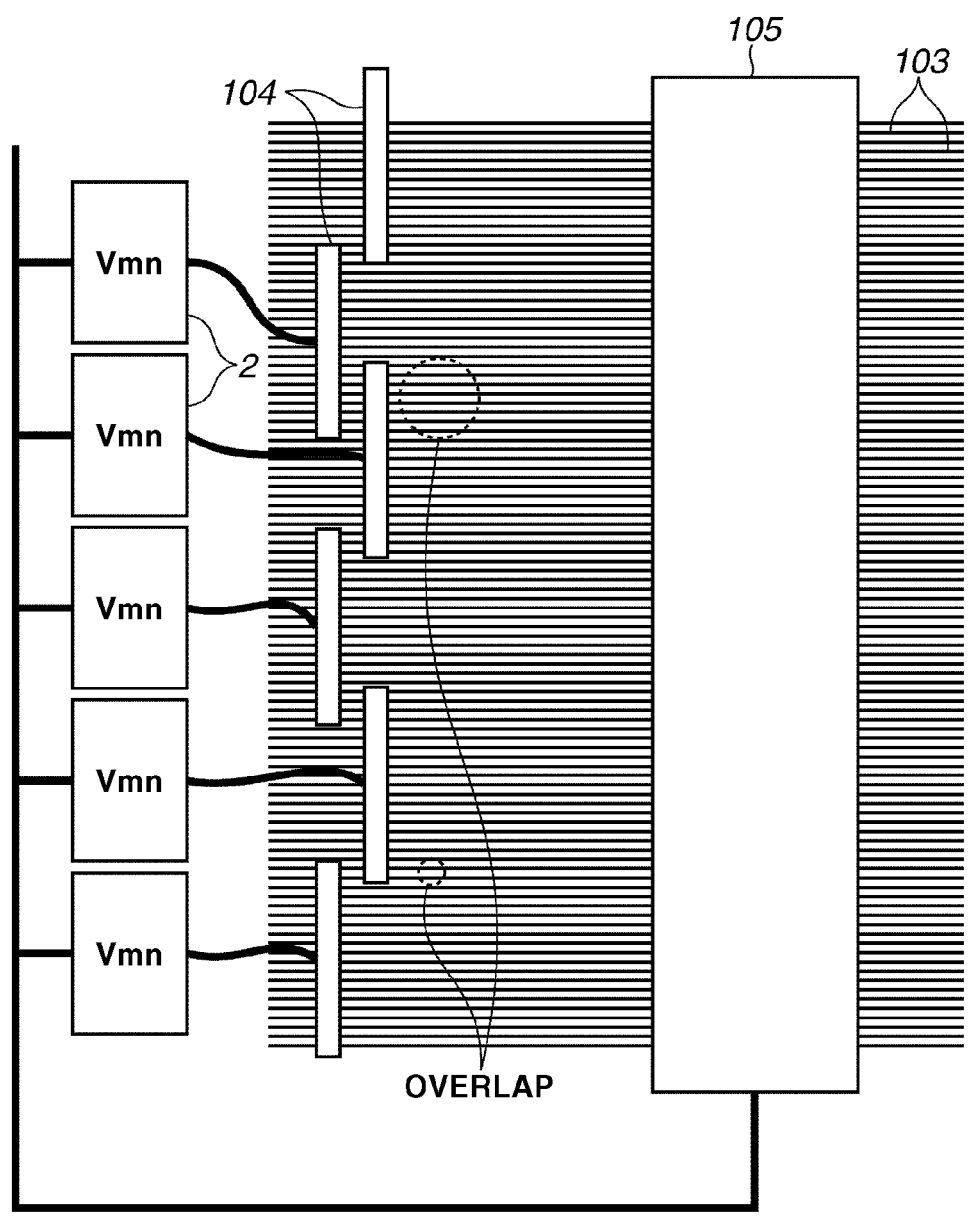
FIG. 12 illustrates an example of an arrangement of the power feed contact.

FIG. 12 is described. FIG. 12 illustrates that power feed contacts, each of which collectively supplies power to 20 wires, are arranged side by side. If the power feed contacts are arranged side by side as illustrated in FIG. 11, high accuracy in a space between and a position of the arranged power feed contacts is required, taking a lot of trouble when a power feed contact needed to be replaced periodically due to degradation is replaced and arranged again.

According to the present disclosure, the number of the wires with which two adjacent power feed contacts duplicatively come into contact is not limited and there is no problem in particular if the power feed contacts are arranged such that the number of the wires with which the power feed contacts duplicatively come into contact is not constant. For example, in a case where 100 power feed contacts are arranged, there is no need to evenly arrange the power feed contacts in an accurate position. The power feed contacts are arranged such that a part of them is overlapped, allowing all the wires to be supplied with power. The reason for this is described in detail below in FIG. 13.

There is provided a power supply control unit for controlling a machining power supply that supplies individually so that pulses of the machining power supplies supplied to the two adjacent power feed contacts become equal to each other. If the equal pulses are not supplied, conditions for the applied pulse (time) make a difference between the overlap and non-overlap portions to differentiate conditions for the electrical discharge machining.

FIG. 13 is described. FIG. 13 illustrates that two adjacent power feed contacts A and B are arranged so as to duplicatively come into contact with a part of wires among a plurality of wires.

As described above, since the maximum value of current per wire can be restricted by the resistance Rwn of each wire and the current value of sum of Iw8+Iw1' flowing into duplicated wires is substantially equal to the current value of a single Iw7 flowing into non-duplicated wires, the machining accuracy of a workpiece between the duplicated and non-duplicated wires does not become non-uniform.

The semiconductor ingot sliced by the multi-wire electrical discharge machining system according to the present disclosure can be used as a substrate for a semiconductor or a substrate for a solar cell.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2012-101901 filed Apr. 26, 2012 which is hereby incorporated by reference herein in its entirety.

What is claimed is:

1. A wire electrical discharge machining system configured to slice a workpiece at an interval of wires arranged side by side at equally spaced intervals, the wire electrical discharge machining system comprising:
    a plurality of main rollers configured to cause the wires arranged side by side to travel in the same direction; and
    a power feed contact configured to collectively supply a machining power to a plurality of wires that are, from among the wires arranged side by side and being caused by the plurality of main rollers to travel, disposed next to each other,
        wherein two adjacent power feed contacts respectively come into contact with the plurality of wires that are, from among the wires arranged side by side, disposed next to each other and arranged without being aligned in a direction vertical to a direction in which the wires arranged side by side travel, and
        wherein the two adjacent power feed contacts are each arranged to duplicatively come into contact with a part of wires from among the plurality of wires disposed next to each other with which the two power feed contacts respectively come into contact.

2. The wire electrical discharge machining system according to claim 1, wherein the power feed contact collectively supplies the machining power supply to less than or equal to 30 of wires that are, from among the traveling wires arranged side by side, disposed next to each other.

3. The wire electrical discharge machining system according to claim 1, wherein the power feed contacts are arranged so a number of the part of the wires included in the plurality of wires disposed next to each other and with which each of the two adjacent power feed contacts duplicatively come into contact is not constant.

4. The wire electrical discharge machining system according to claim 1, further comprising a machining power supply portion configured to individually supply the machining power to the power feed contact.

5. The wire electrical discharge machining system according to claim 4, further comprising a power supply control unit configured to control the machining power supply so pulses of the machining power supplied to the two adjacent power feed contacts are equal to each other.

6. The wire electrical discharge machining system according to claim 4, wherein a voltage drop between the machining power supply portion and the power feed contact is less than a voltage drop between the power feed contact and an electrical discharge portion, wherein the electrical discharge portion performs an electrical discharge to the workpiece.

7. The wire electrical discharge machining system according to claim 4, wherein a resistance value between the machining power supply portion and the power feed contact is less than a resistance value between the power feed contact and an electrical discharge portion, wherein the electrical discharge portion performs an electrical discharge to the workpiece.

8. A wire electrical discharge machining method for slicing a workpiece using a wire electrical discharge machining system configured to slice the workpiece at an interval of wires arranged side by side at equally spaced intervals, the wire electrical discharge machining system comprising:
  a plurality of main rollers configured to cause the wires arranged side by side to travel in the same direction; and
  a power feed contact configured to collectively supply a machining power to a plurality of wires that are, from among the wires arranged side by side and being caused by the plurality of main roller to travel, disposed next to each other,
  wherein two adjacent power feed contacts respectively come into contact with the plurality of wires that are, from among the wires arranged side by side, disposed next to each other and arranged without being aligned in a direction vertical to a direction in which the wires arranged side by side travels, and
  wherein the two adjacent power feed contacts are each arranged to duplicatively come into contact with a part of wires from among the plurality of wires disposed next to each other with which the two power feed contacts respectively come into contact.

* * * * *